United States Patent [19]

Henderson

[11] 4,333,250
[45] Jun. 8, 1982

[54] MULTI-PURPOSE ATTACHMENT FOR VEHICLES

[76] Inventor: Joe W. Henderson, Rte. 2, Box 894, Claremore, Okla. 74017

[21] Appl. No.: 75,828

[22] Filed: Sep. 14, 1979

[51] Int. Cl.³ .................... E02F 3/62; A01B 59/042
[52] U.S. Cl. ............................ 37/117.5; 172/445.1; 172/272; 172/739; 280/460 A; 414/723; 37/DIG. 3
[58] Field of Search ............... 172/272, 34, 275, 136, 172/443, 248, 250, 251, 247, 274, 253, 254, 739; 280/479 A, 460 A, 460 R, 490 A, 415 B; 414/723, 607, 608; 37/139, 140, 137, 138, 117.5, DIG. 3, DIG. 12

[56] References Cited

U.S. PATENT DOCUMENTS

| | | | |
|---|---|---|---|
| 2,417,595 | 3/1947 | Heath | 172/247 X |
| 2,548,461 | 4/1951 | Arps | 172/247 |
| 2,691,932 | 10/1954 | Sawyer | 172/272 |
| 2,711,679 | 6/1955 | Kuhary | 172/272 |
| 4,019,753 | 4/1977 | Kestel | 172/248 |

FOREIGN PATENT DOCUMENTS

| | | | |
|---|---|---|---|
| 1007599 | 2/1952 | France | 172/272 |
| 1443815 | 5/1966 | France | 172/443 |
| 736868 | 9/1955 | United Kingdom | 280/490 A |

Primary Examiner—Richard J. Johnson
Attorney, Agent, or Firm—Head & Johnson

[57] ABSTRACT

An attachment for powered vehicles comprising a universal carrier member adapted to be secured to the lift apparatus of the vehicle and pivotally supporting a multi-purpose scoop implement having a plurality of operating positions, one of the operating positions providing a scoop for the vehicle, another of the operating positions providing a load carrier for the vehicle, and yet another operating position providing a scraper for the vehicle. In addition, the carrier member may be utilized for carrying a plurality of implements for expanding the usefulness of the vehicle. For example, a roller, a cultivator, a spool or core for facilitating the winding and unwinding of fencing and the like, a soil loosening device, a fork lift attachment, and the like, may be supported by the carrier member whereby the vehicle may be utilized for substantially unlimited number of work operation.

7 Claims, 26 Drawing Figures

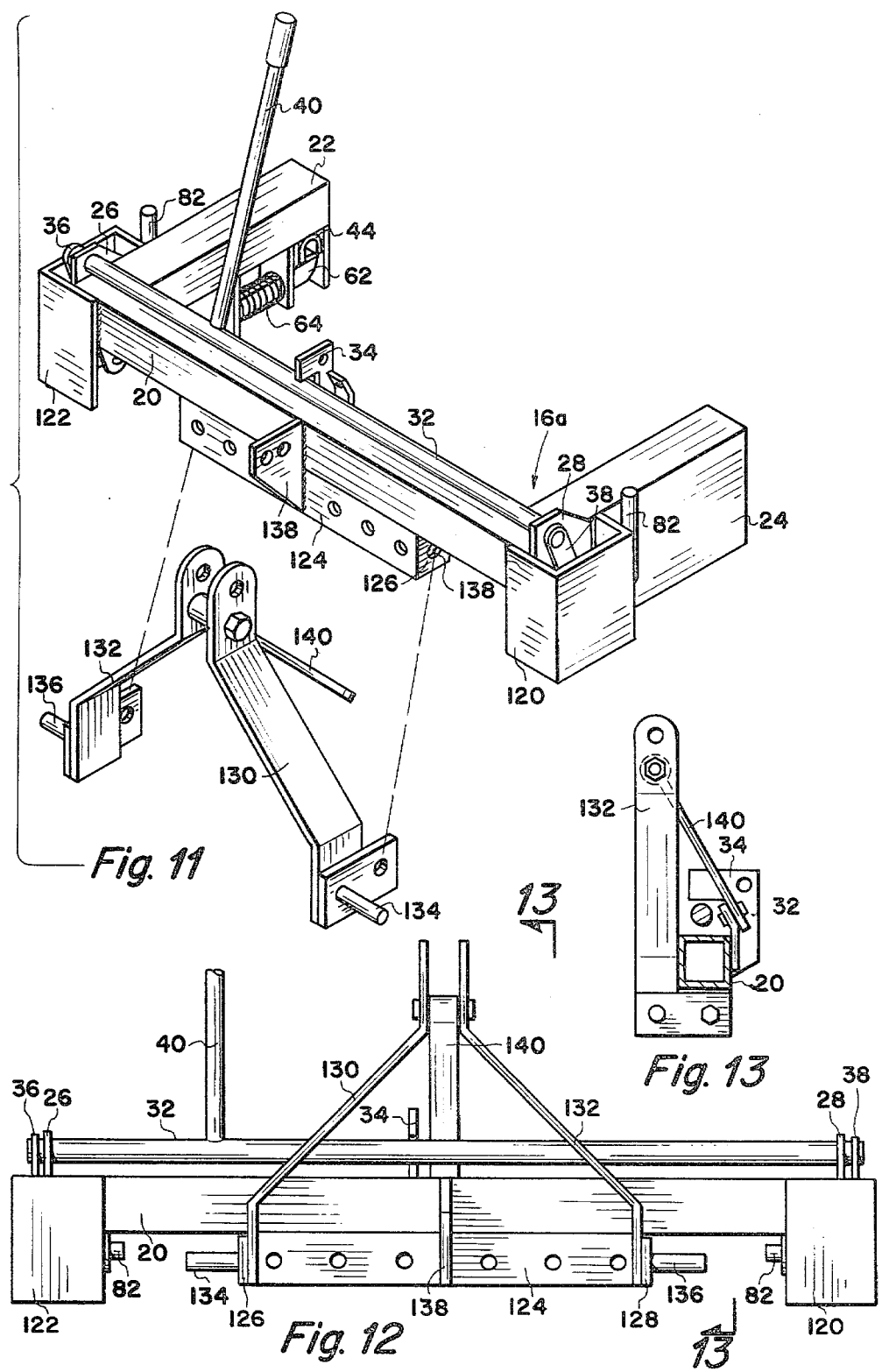

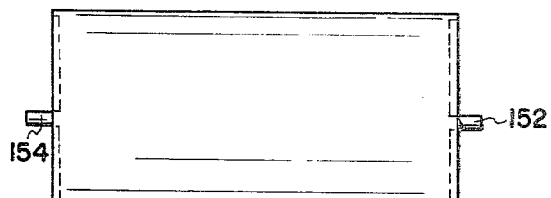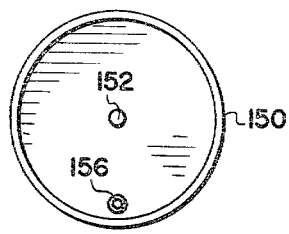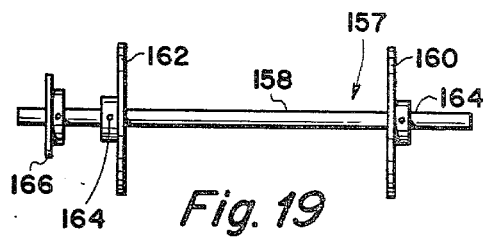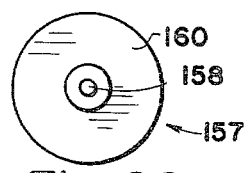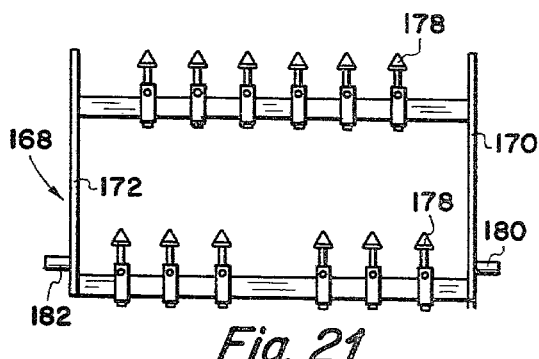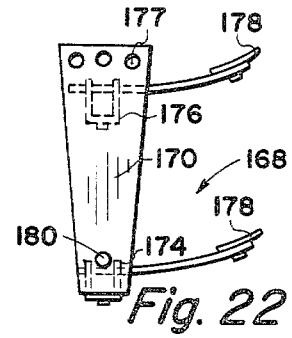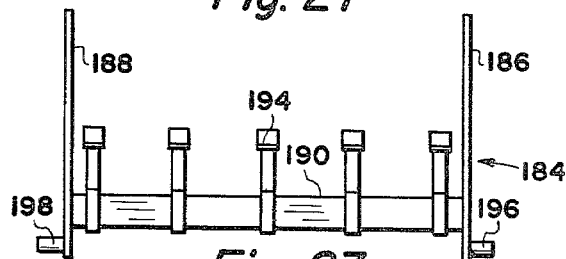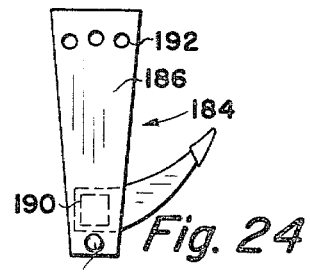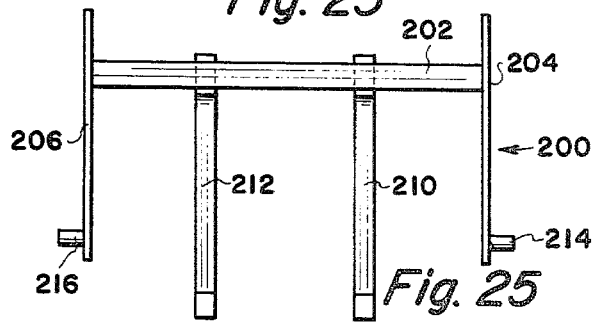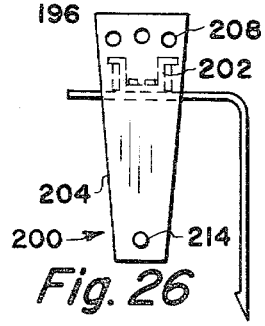

MULTI-PURPOSE ATTACHMENT FOR VEHICLES

BACKGROUND OF THE INVENTION

1. Field of the Invention

This invention relates to improvements in attachments for powered vehicles and more particularly, but not by way of limitation, to a universal carrier member for securing multi-purpose implements to the vehicle.

2. Description of the Prior Art

Vehicle, such as garden tractors, and the like, are widely used for a variety of purposes, and are normally provided with a lift apparatus or hitch member for securing the working tool or implement to the vehicle for operation thereby. Many types of implements may be provided for the vehicle, such as a scoop for retrieving loose materials from the surface of the ground, a load carrier for moving material from one site to another, a material or ground levelling apparatus, or the like. These devices are usually separate or independent pieces of equipment thus requiring removal of one apparatus and installation of another apparatus for performing the desired plurality of work operations. In addition, each of these devices are usually designed for use with one particular brand vehicle, and in the event one changes vehicles for some reason, it is normally necessary to replace all of the added implements to be utilized in conjunction therewith.

SUMMARY OF THE INVENTION

The present invention contemplates a novel attachment apparatus for vehicles, comprising a universal carrier member adapted to be secured to substantially a suitable vehicle, such as a garden tractor, or the like, for supporting a multi-purpose implement which may be utilized for a plurality of work operations. In one position of the implement with respect to the carrier, the implement may be utilized as a scoop for retrieving loose materials, and the like. In a second relative position with respect to the carrier, the implement may be utilized as a load handler for transporting loads from one site to another. In yet another position with respect to the carrier, the implement may be utilized as a leveling device for levelling or smoothing loose materials, such as spreading dirt or soil over the surface of the earth. In addition, other work implements may be secured to the common or universal carrier member in lieu of the multi-purpose implement whereby other work operations may be accomplished, such as cultivating the land, aerating the soil, winding and/or unwinding fencing, and the like. The novel apparatus is simple and efficient in operation and economical and durable in construction.

BRIEF DESCRIPTION OF THE DRAWINGS

FIG. 11 is a perspective view of a modified universal carrier member utilized in the invention.

FIG. 12 is a rear elevational view of the modified carrier shown in FIG. 11.

FIG. 13 is a view taken on line 13—13 of FIG. 12.

FIG. 17 is a side elevational view of an implement utilized in the invention in lieu of the multi-purpose implement of FIGS. 1 through 4.

FIG. 18 is an end view of the implement shown in FIG. 17.

FIG. 19 is a side elevational view of another implement utilized in the invention in lieu of the implement shown in FIGS. 1 through 4.

FIG. 20 is an end view of the implement shown in FIG. 19.

FIG. 21 is a side elevational view of still another implement utilized in the invention in lieu of the implement shown in FIGS. 1 through 4.

FIG. 22 is an end elevational view of the implement shown in FIG. 21.

FIG. 23 is a side elevational view of a further implement utilized in lieu of the implement shown in FIGS. 1 through 4.

FIG. 24 is an end elevational view of the implement shown in FIG. 23.

FIG. 25 is a side elevational view of a still further implement utilized in lieu of the implement shown in FIGS. 1 through 5.

FIG. 26 is an end elevational view of the implement shown in FIG. 25.

DESCRIPTION OF THE PREFERRED EMBODIMENTS

Figure 1:
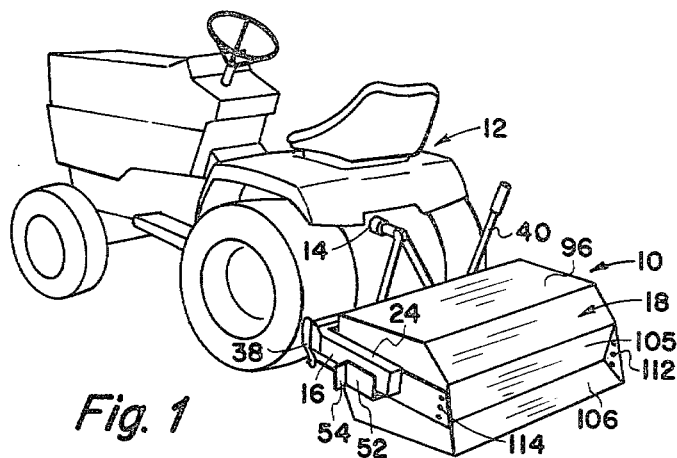
FIG. 1 is a perspective view of a garden tractor type vehicle having an attachment apparatus embodying the invention secured thereto and depicting one working position thereof.
Figure 2:
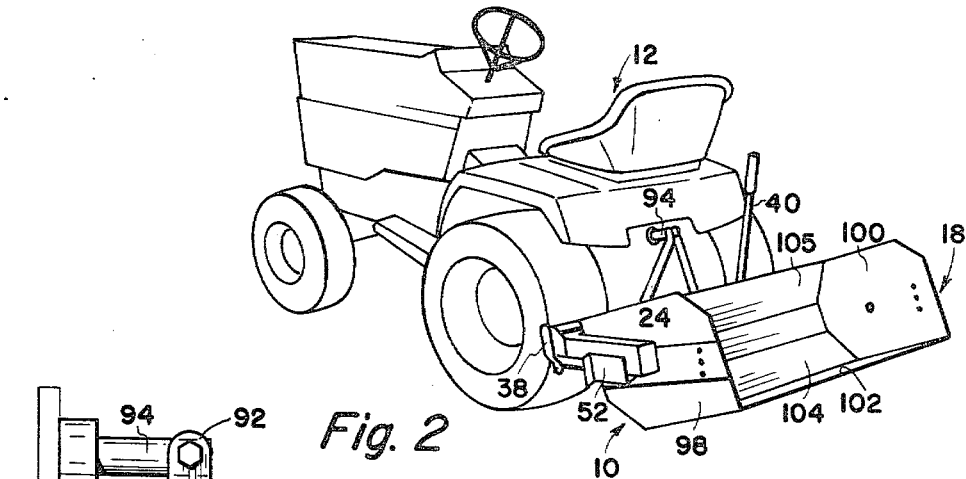
FIG. 2 is a view similar to FIG. 1 illustrating another working position for the apparatus embodying the invention.

Referring to the drawings in detail, and particularly FIGS. 1 through 10, reference character 10 generally indicates an attachment for suitable vehicles, such as a garden tractor 12. These vehicles are normally provided with a lift mechanism as generally indicated at 14 which is operably connected with the hydraulic system (not shown), or the like, of the vehicle. Of course, the arrangement or construction of lift mechanism 14 usually varies from vehicle to vehicle, and the usual practice is to utilize only implements particularly designed for a particular vehicle, and the implements are normally not interchangeable between vehicles. The attachment 10, however, is particularly designed and constructed for use with substantially any vehicle of this type, and the vehicle 12 depicted herein is merely illustrative of a suitable towing vehicle.

The attachment 10 comprises a universal carrier 16 which carries or supports a multi-purpose implement 18, the operating positions of which may be altered with respect to the carrier assembly 16 for providing a plurality of work operations. The carrier 16 comprises a cross member 20 preferably of a substantially square cross-sectional configuration, but not limited thereto, and having a pair of oppositely disposed substantially mutually parallel arm members 22 and 24 extending outwardly therefrom and substantially coplanar therewith. A pair of substantially identical flanges 26 and 28 are welded or otherwise secured to the opposite ends of the cross member 20 of the arms 22 and 24, respectively, and extend upwardly therefrom as viewed in the drawings. Each of the flanges 26 and 28 is provided with an arcuate recess 30 in the upper edge thereof for rotatably supporting the opposite ends of the rod 32 therein. The rod 32 is spaced from the upper surface of the cross member 20 and extends substantially parallel thereto. It is also preferable to provide an apertured support flange 34 secured to the cross member 20 between the flanges 22 and 24 for rotatably receiving the rod 32 therethrough for added strength therefor.

A first link member 36 is rigidly secured to one end of the rod 32 outboard of the flange member 26 and in spaced relation thereto. A second link member 38 substantially identical to the link member 36 but oppositely disposed with respect thereto is rigidly secured to the opposite end of the rods 32 in spaced relation to the flange 28. A lever member 40 is welded or otherwise rigidly secured to the outer periphery of the rod 32 and extends radially outwardly therefrom. The lever 40 is preferably interposed between the flanges 26 and 28 and may be manually grasped in any well known or suitable manner for rotating the rods 32 about its own longitudinal axis. The link members 36 and 38 move simultaneously with the rotation of the rod 32 between a first position as shown in solid lines in FIG. 7, and a second position shown in broken lines therein for a purpose as will be hereinafter set forth.

The arm members 22 and 24 are substantially identical in structure, and only one will be set forth in detail herein. The arm 22 is preferably of a substantially square cross-sectional configuration, but not limited thereto, and the outer end thereof is closed by a suitable plate member 42 which extends below the lower limit of the arm 22 as particularly shown in FIG. 7. A channel member 44 of substantially inverted U-shaped configuration is welded or otherwise secured to the bottom surface of the arm 22 and to the inwardly directed face of the plate 42 whereby the bottom 45 thereof is open. A plate 46 is welded to the outer surface of the arm 22 for closing the outer end of the U-channel 44 and an elongated plate 52 is welded to the lower edge of the outer surface of the arm 22 and preferably has one end in abuttment with the edge of the plate 46, and the opposite end thereof disposed in spaced relation thereto. An outwardly extending flange 54 is provided on the outer end of the plate 52 for a purpose as will be hereinafter set forth. A substantially J-shaped channel member 56 has the outer ends of the legs thereof welded or otherwise secured to the inner surface of the plate 52 and is preferably welded or secured to the under surface of the arm 22 as viewed in the drawings. The legs of the U-channel 56 are provided with aligned apertures 58 and 60 for slidably receiving a latch member 62 therethrough. A suitable helical spring 64 is disposed around the outer periphery of the latch 62 and has one end anchored against the inner surface of one leg of the U-channel 56 and the opposite end thereof anchored at a cross pin 66 which extends transversely through the latch member 62. The spring 64 constantly urges the latch member 62 in a right hand direction as viewed in FIG. 7, and the engagement of the cross pin 66 with the right hand leg of the U-channel 56 limits the movement of the latch pin 62 in the right hand direction.

The inner end of the latch pin 62 is provided with an aperture (not shown) for receiving one end 68 of a pull rod 70 therein. The opposite end 72 of the pull rod 70 is suitably secured to the link member 36 in the proximity of the outer end thereof. The normal position for the pull rod 70 and latch member 62 is the full right hand position thereof as shown in solid lines in FIG. 7. However, when the lever 40 is moved in a clockwise direction as viewed in FIG. 7, the pin 66 is pulled in a left hand direction against the force of the spring 64, and the pull rod 70 and latch member 62 may thus be moved to the position shown in broken lines. In the normal position of the latch member 62, the latch 62 extends across the open end 45 of the U-channel 44 for closing thereof, and in the reverse or released position of the latch 62, the latch is removed from the open end 45 of the U-channel 44 for opening thereof for a purpose as will be hereinafter set forth.

Figure 6:
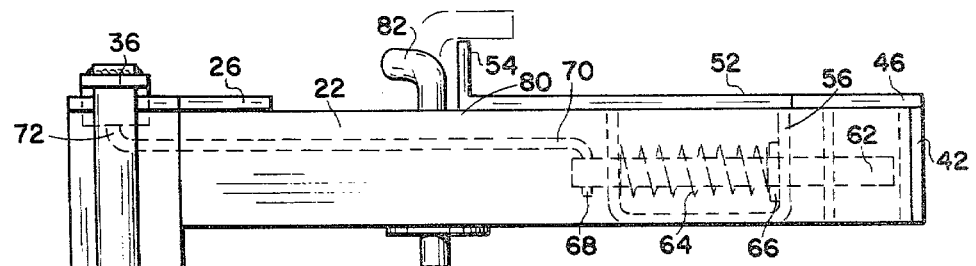
FIG. 6 is an enlarged top view of one arm of the carrier member shown in FIG. 5.
Figure 8:
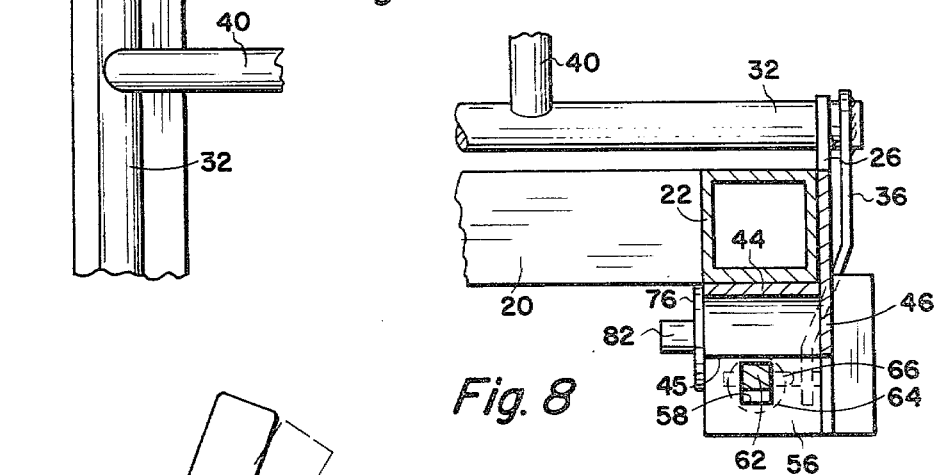
FIG. 8 is a view taken on line 8—8 of FIG. 7.
Figure 7:
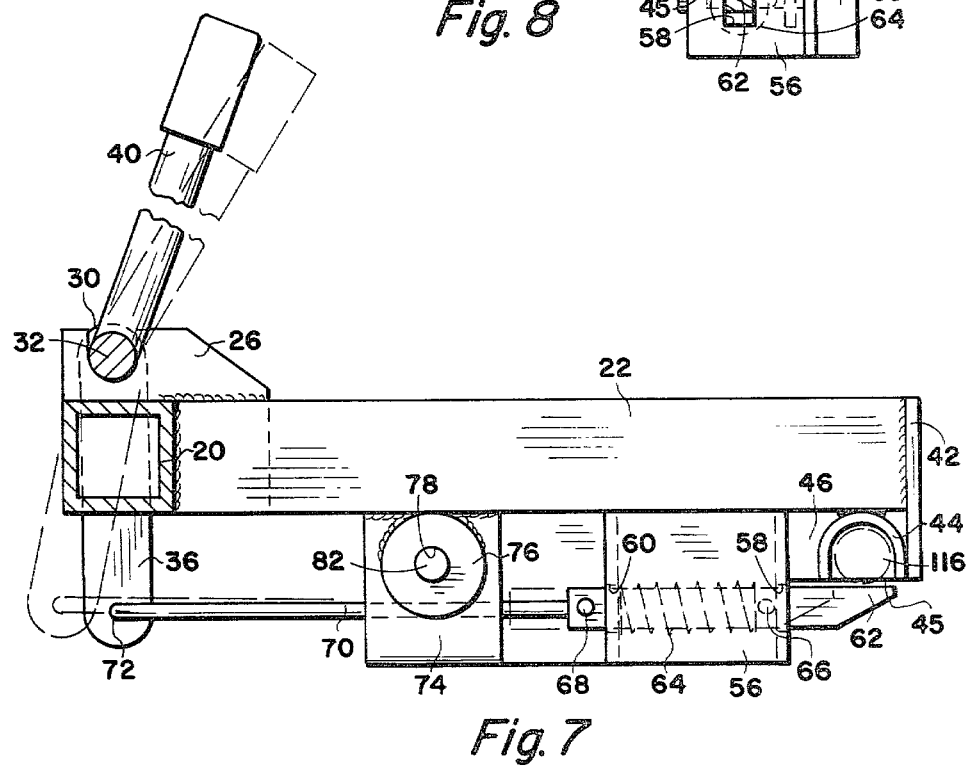
FIG. 7 is a view taken on line 7—7 of FIG. 6.
Figure 9:
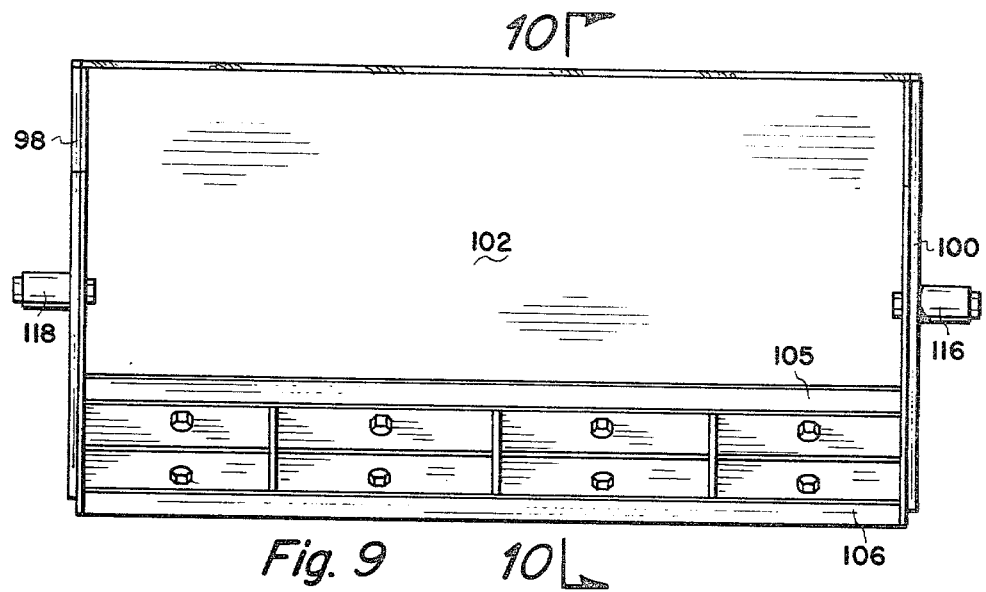
FIG. 9 is a top view of a multi-purpose implement utilized in the invention.
Figure 10:
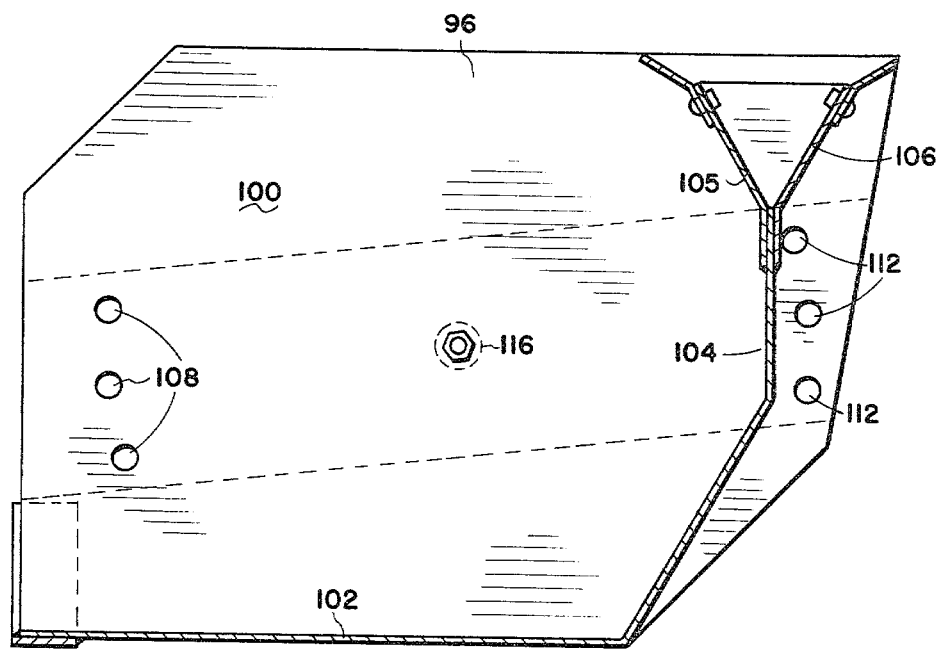
FIG. 10 is a view taken on line 10—10 of FIG. 9.

A plate member 74 has one edge thereof welded or otherwise secured to the under surface of the arm 22 preferably in the proximity of the inner wall thereof and extends downwardly therefrom as shown in FIG. 7. A reinforcing disc 76 is welded to the outer surface of the plate 74 and is provided with an aperture 78 therein. A similar plate 80 is welded to the underside of the arm 22 in the proximity of the outer edge thereof and is provided with an aperture (not shown) in substantial alignment with the aperture 78. A latch member 82 extends slidably through the aligned apertures and is spring loaded in any suitable or well known manner (not shown) for retaining the latch 82 in a normally full engaged position with respect to the apertures as shown in FIG. 6, while permitting a limited withdrawal thereof for reducing the extension thereof beyond the plate 74 for a purpose as will be hereinafter set forth.

Figure 3:
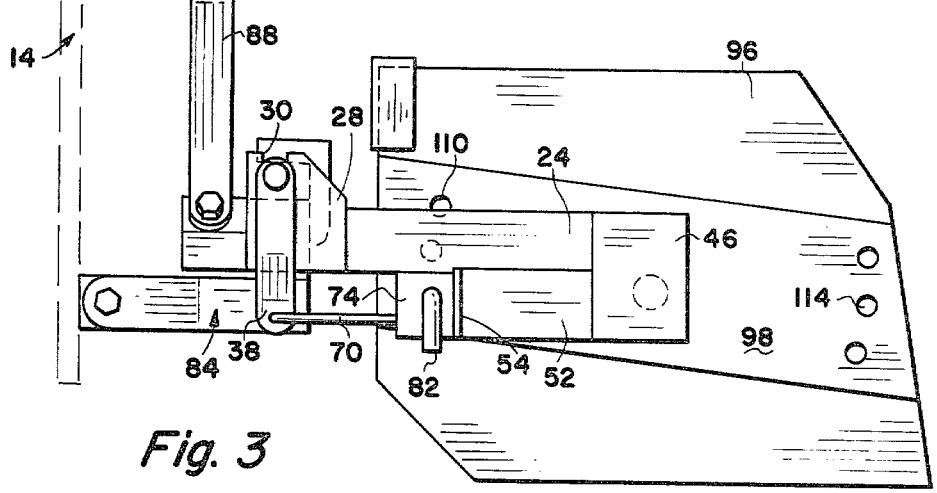
FIG. 3 is a side elevational view of a multi-purpose attachment for vehicles and which embodies the invention.
Figure 4:
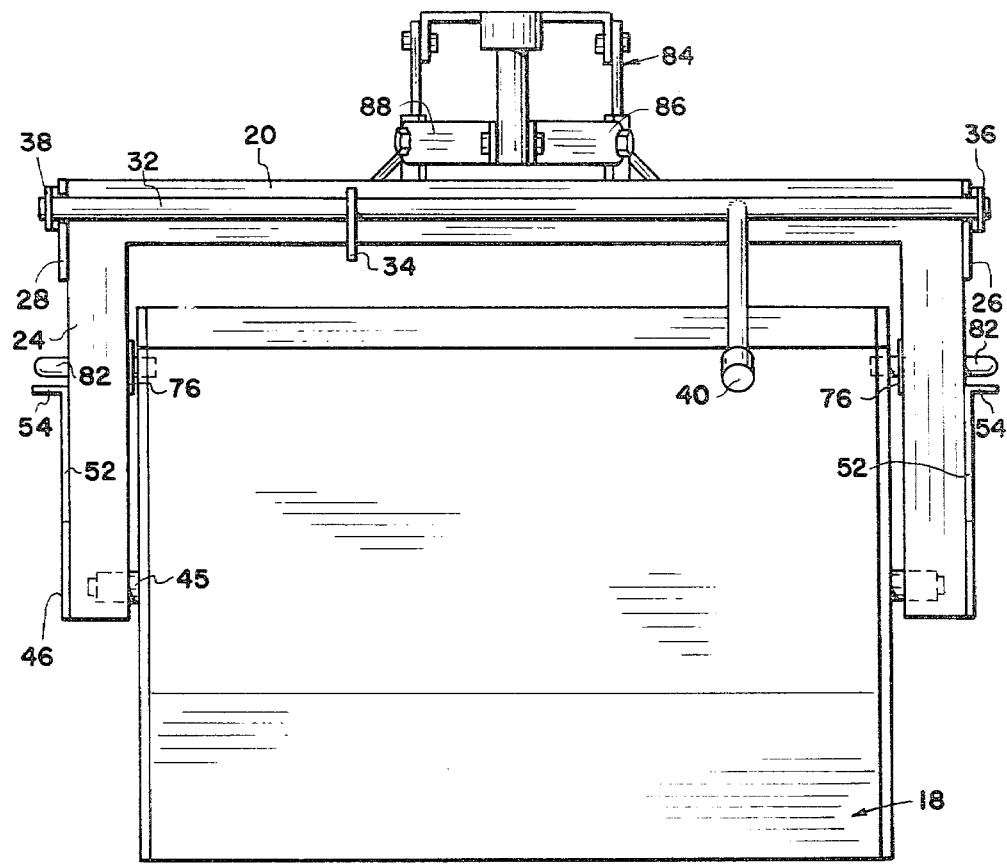
FIG. 4 is a top view of the multi-purpose attachment shown in FIG. 3.
Figure 5:
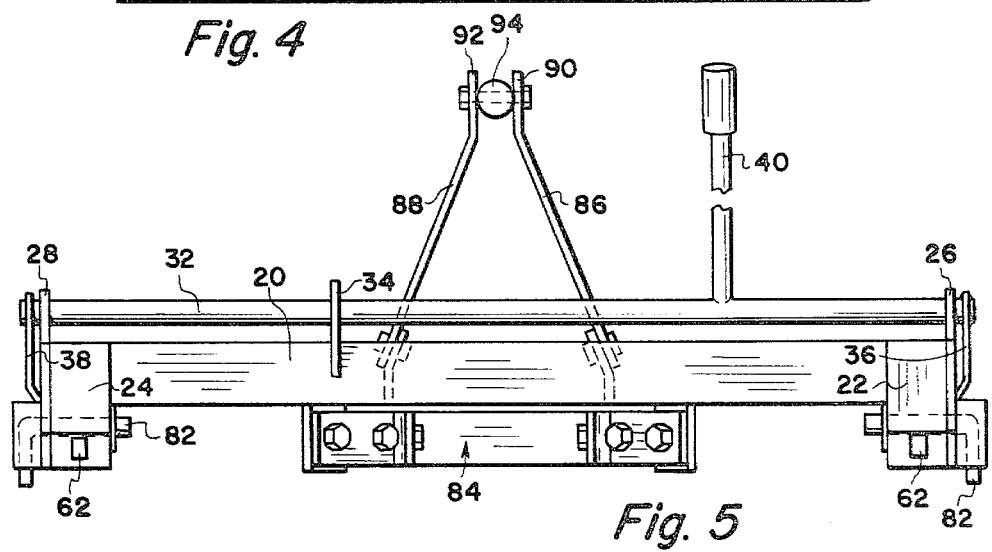
FIG. 5 is a front elevational view of a universal carrier member utilized in the invention.

A centrally disposed bracket assembly 84 is suitably secured to the under side of the cross member 20 in any well known manner and extends outwardly therefrom in a direction away from the arms 22 and 24 as particularly shown in FIG. 3 for facilitating securing of the apparatus or attachment 10 to the vehicle 12. In addition a pair of upstanding inwardly converging connecting arms 86 and 88 are secured to the outer surface of the cross member 20 in spaced relation with respect thereto and are provided with oppositely disposed spaced apertured flanges 90 and 92 at the outer ends thereof for removably receiving a connector 94 therebetween. The connector 94 is particularly designed and constructed for removable connection with the lift apparatus 14.

The multi-purpose implement 18 comprises a container 96 having the sides thereof closed by oppositely disposed walls 98 and 100 which are spaced apart by a plate 102 having an angularly disposed wall portion 104 conterminous with one edge thereof. As viewed in FIGS. 9 and 10, the plate 102 and wall 104 form a bottom and front, respectively, for the container 96, leaving the top and rear sides thereof open for a purpose as will be hereinafter set forth. A pair of outwardly diverging flanges 105 and 106 are welded or otherwise secured along the upper edge of the wall 104 and are secured between the spaced side walls 100 and 102 for a purpose as will be hereinafter set forth. A plurality of spaced apertures 108 are provided in the wall 100 in the proximity of the left hand end thereof as viewed in FIG. 10, and a similar plurality of apertures 110 (FIG. 3) are provided in the wall 98 in alignment with the apertures 108. A second plurality of spaced apertures 112 are provided in the wall 100 in the proximity of the right hand end thereof as viewed in FIG. 10, and a similar plurality of apertures 114 are provided in the wall 98 in substantial alignment with the apertures 112. In addition, a pivot member or journal 116 is suitably secured in the wall 100 substantially centrally disposed between the apertures 108 and 112, and extends outwardly therefrom as particularly shown in FIG. 9. A second journal 118 is similarly secured to the wall 98 in substantial axial alignment with the journal 116 and extends outward from the wall 98 in the same manner.

When the multi-purpose implement 18 is to be secured to the universal carrier 12, the lever 40 may be manually moved in the proper direction for removing the latch 62 from the open end 45 of the U-channel 44, as hereinbefore set forth. The journal members 116 and 118 may then be inserted into the respective U-channel 44 through the open ends 45 thereof, and the lever 40 may be released whereby the springs 64 return the latches 62 to the normal position thereof across the open ends 45. The latches 62 then securely retain the journals 116 and 118 in position in the respective U-channels 44 as indicated in broken lines in FIG. 7. In addition, the spring loaded latches 82 are manually withdrawn or retracted against the forces of the respective springs (not shown) for reducing the extension length of the latches from the respective plates 76, and the container 96 may be manually pivoted about the journals 116 and 118 to position a selected aligned pair of the apertures 108-110 or 112-114 in alignment with the latches 82. When the container 96 has been orientated with respect to the carrier 16, the latches 82 may be released whereby the respective springs will move the latches 82 to the normal position thereof, thus inserting the inner end of the latches through the selected aligned apertures of the walls 100 and 102. It will be apparent that the orientation of the container 96 with respect to the carrier 10 will be selected in accordance with position of the selected apertures in which the latches 82 are inserted.

For example, as shown in FIG. 1, the container 96 is in a substantially "upside-down" position whereby the bottom and rear portions thereof are open, and the outer edge of the flange 106 may be positioned against the surface of the ground. In this arrangement, the implement 18 may be utilized as a leveling apparatus as the vehicle 12 traverses the surface of the earth. In the position shown in FIG. 2, the plate 102 forms a bottom for the container 96, with the plate 104 and flange 105 forming a back therefor whereby the implement 18 may be utilized as a scoop in the usual or well known manner thereof. It will be readily apparent that in yet another position of the implement 18 with respect to the carrier 16, the implement may be utilized for carrying a load of material from one site to another, whereas still another position of the implement 18 with respect to the carrier 16 permits the implement 18 to function as a dumping vehicle for discharge of the contents thereof in the usual or well known manner. Thus, the apparatus 10 transfers substantially any suitable wheeled vehicle, such as the garden tractor 12 into a multi-purpose vehicle for performing a plurality of work operations.

Of course, it will be further apparent that the container 96 may be readily removed from the carrier 16 by manipulating the lever 40 in such a manner as to withdraw the latch 62 from the position across the open end 45 of the U-channel 44 whereupon the journals 116 and 118 may be withdrawn through the open ends 45 for releasing the engagement between the carrier and the container.

Referring now to FIGS. 11, 12 and 13, a modified carrier apparatus 16a is shown which is generally similar to the carrier 16 with the exception that a box or three-sided cover 120 is welded or otherwise secured to the arm 24 and cross member 20 for protection of the link member 38, and a similar oppositely disposed cover 122 is secured to the arm 22 and the cross member 20 for protection of the link member 36. In addition, the cover members 120 and 122 function as retainer or stop members for holding the respective latch members 82 in a retracted position. For example, the latch 82 may be manually withdrawn or moved in a direction away from the arm 24 through a sufficient distance whereby the outer portion of the latch 82 may be pivoted in a direction for positioning thereof as shown in broken lines in FIG. 11. The force of the actuation spring (not shown) pulls the latch 82 firmly against the cover 120 for retaining the latch 82 in the withdrawn position. This facilitates the alteration of the position of the implement 18 with respect to the carrier 16a. Of course, the oppositely disposed latch 82 may be similarly retained in the withdrawn or retracted position thereof. When the latches 82 are to be returned to the normal positions therefore, they may be manually rotated into a position out of engagement with the covers 120 and 122, and the force of the actuator spring will move the latches to the normal position.

In addition, in lieu of the bracket 84, an apertured flange 124 is welded to the underside of the cross member 20 and end flanges 126 and 128 are secured at the opposite ends of the flange 124. A pair or inwardly directed angular arm members 130 and 132 are provided with outwardly extending studs 134 and 136, respectively, which extend through aligned apertures 138 (only one of which is shown in FIG. 11) provided in the end flanges 126 and 128. An apertured flange 138 is welded to the outer surface of the cross member 20 and flange 124, and an angularly disposed strap member 140 has one end bolted or otherwise secured between the upper spaced ends of the angular arms 130 and 132 and the cross member 20. In this manner, the carrier 16a may be readily secured to the lift 14 of substantially any suitable vehicle 12.

Figure 14:
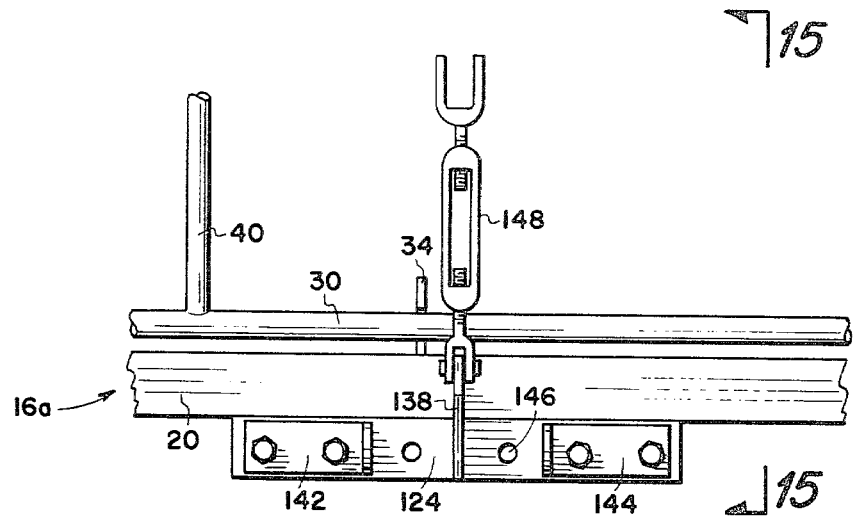
FIG. 14 is a broken rear elevational view of still another modified carrier utilized in the invention.
Figure 15:
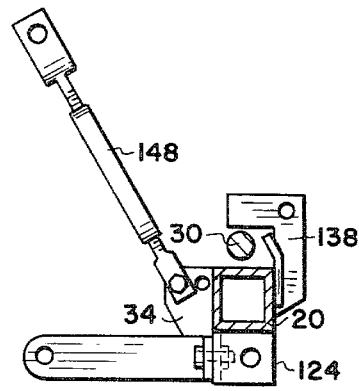
FIG. 15 is a view taken on line 15—15 of FIG. 14.
Figure 16:
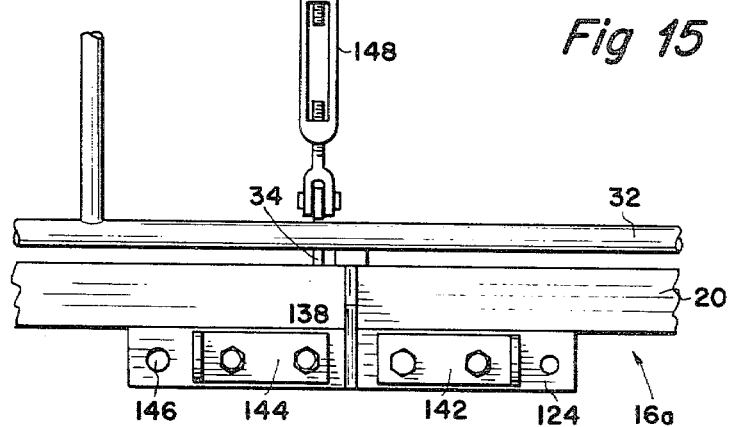
FIG. 16 is a view similar to FIG. 14 illustrating a modification thereof for attachment to different vehicles.

FIGS. 14, 15 and 16 illustrate another modification of the carrier member 16a wherein the flange 124 is provided with a pair of spaced oppositely disposed substantially L-shaped brackets 142 and 144 bolted or otherwise secured to the spaced apertures 146 of the flange 124. These brackets 142 and 144 may be utilized in lieu of the end flanges 126 and 128, and the positions of the brackets 142 and 144 may be reversed as particularly shown in FIGS. 14 and 16 in accordance with the requirements of the particular vehicle 12 with which the apparatus 10 is to be utilized. Also, a suitable turnbuckle 148 may be utilized in lieu of the angular arms 130 and 132, and may be bolted or otherwise secured to the apertured flange 138 as particularly shown in FIG. 14, or may be bolted or otherwise similarly secured to the flange 34, if desired and is shown in FIG. 16.

Referring now to FIGS. 16 through 26, alternate implements which may be utilized in combination with the carrier 16 or 16a in lieu of the implement 18 are shown. FIGS. 17 and 18 illustrate a roller or hollow cylinder computer 150 having oppositely disposed journals 152 and 154 extending axially outwardly from the opposite ends thereof for connection with the U-channels 44 of the carrier in the same manner as hereinbefore set forth. A suitable access and/or drain port 156 may be provided for the cylinder 150 in order that water, or the like (not shown) may be injected into the interior thereof for adding weight to the cylinder 150 as is well known.

FIGS. 19 and 20 illustrate a spool 157 for supporting rolls of wires, fencing, or the like (not shown), and comprising an axially extending shaft 158 providing a core for the spool 157, and a pair of substantially circular end plates 160 and 162 keyed or otherwise secured to the shaft 158 and retained in spaced relation by suitable pins or screws 164, as is well known. The opposite ends of the shaft 158 provide journals for connection with the U-channels 44 of the apparatus 10 as hereinbefore set forth. Of course, a suitable brake 166, or the like, may be provided on the shaft 160 outboard of the respective end plate 162, if desired, in order to control the speed of rotation of the spool 157, as is well known.

FIGS. 21 and 22 illustrate a cultivator apparatus 168 comprising a pair of spaced plate members 170 and 172 spaced apart by a pair of transversely extending spaced channel members 174 and 176. Each plate 172 and 170 is provided with spaced apertures 177 similar to the apertures 108 and 114 for receiving the latch 82 therein in the same manner and for the same purpose as hereinbefore set forth. Suitable cultivator tines or elements 178 are secured to each of the channels 174 and 176 in spaced relation and in a suitably mutually staggered relationship for performing a cultivating operation as the apparatus 168 moves along the surface of the earth during movement of the vehicle 12. A pair of outwardly extending journals 180 and 182 are secured to the outer faces of the plates 170 and 172 and are in substantial axial alignment for connection with the U-channels 44 of the carrier 16 or 16a as hereinbefore set forth.

FIGS. 23 and 24 show a soil ripper device 184 for loosening of the top soil prior to a scraping operation, and which comprises a pair of spaced plates 186 and 188 generally similar to the plates 170 and 172 secured to the opposite ends of a cross member 190. The plates 186 and 188 are provided with a plurality of spaced apertures 192 similar to the apertures 177 and for the same purpose. A plurality of scraping or digging elements 194 are secured to the cross member 190 in spaced relation and extend substantially perpendicularly outwardly therefrom for engaging the top soil during operation thereof, as is well known. A pair of outwardly extending journals 196 and 198 are secured to the outer faces of the plates 186 and 188 are in substantial axial alignment for connection with the U-channels 44 as hereinbefore set forth.

FIGS. 25 and 26 show a fork lift attachment 200 which may be utilized in lieu of the implement 18 and which comprises a cross member 202 having substantially identical plates 204 and 206 suitably secured to the outer ends thereof. Each plate 204 and 206 is provided with a plurality of spaced apertures 208 similar to the apertures 177 and for the same purpose. In addition, a pair of lifting arms 210 and 212 are suitably secured to the cross member 202 and extending outwardly therefrom for mutual cooperation in lifting and supporting loads in the manner of the usual fork lift, as is well known. A pair of outwardly extending journals 214 and 216 are secured to the outer faces of the plates 204 and 206 and are in substantial axial alignment for connection with the U-channels 44 as hereinbefore set forth.

From the foregoing it will be apparent that the present invention provides attachment for vehicles of the garden tractor type which comprises a universal carrier structure adapted for installation on substantially any suitable vehicle in connection with the usual lifting apparatus thereof, and a multi-purpose implement removably secured to the carrier and readily adjustable to provide a plurality of relative positions therebetween for performing a plurality of work operations. The multi-purpose implement may be rotated through a complete 360° arc with respect to the universal carrier and about the axes of the supporting journals, and be reversible within the carrier. In addition, a plurality of other implements may be quickly and easily secured to the universal carrier in lieu of the multi-purpose implement, if desired, for performing still additional work operations with the use of a single vehicle. The novel apparatus is simple and efficient in operation and economical and durable in construction.

Whereas the present invention has been described in particular relation to the drawings attached hereto, it should be understood that other and further modifications, apart from those shown or suggested herein may be made within the spirit and scope of this invention.

What is claimed is:

1. A multi-purpose attachment for vehicles having a lift apparatus and comprising universal carrier means of substantially U-shaped configuration adapted for connection with the lift apparatus of the vehicle, implement means supported by the carrier means, journal means provided on the implement means for pivotally securing the implement to the carrier means, hitch means provided on the carrier means for securing thereof to the lift apparatus, dual latch means provided on thereof to the lift apparatus, dual latch means provided on said carrier means for cooperating with said journal means for removably securing the implement means to the carrier means, transversely extending rod means provided on said carrier means and rotatable about its own longitudinal axis for simultaneous actuation of said dual latch means, said implement means being a multi-purpose implement pivotal with respect to the carrier means to provide a plurality of relative working positions therebetween, and including locking means cooperating between the multi-purpose implement and the carrier means for locking the multi-purpose implement in each of said positions to provide for said plurality of work operations for the vehicle from a single implement, the multi-purpose implement comprising a substantially open box-type receptacle having a bottom plate and three conterminous sidewalls extending outwardly therefrom, the opposed sidewalls of the receptacle being provided with a plurality of spaced aligned apertures, and the locking means comprises a pair of oppositely disposed latching pins movably secured to the carrier means and movable between extended and retracted positions with respect to the opposed sidewalls whereby a preselected pair of aligned apertures may be engaged by the latching pins in the extended positions thereof for locking the receptacle in said preselected position, said locking engagement of the latching pins with the apertures being released upon retracting of said latching pins for freeing the receptacle for movement to another relative position with respect to the carrier means, each of said positions of the receptacle providing for a different work operation for the vehicle.

2. A multi-purpose attachment for vehicles having a lift apparatus and comprising universal carrier means of substantially U-shaped configuration adapted for connection with the lift apparatus of the vehicle, implement means supported by the carrier means, journal means provided on the implement means for pivotally securing the implement to the carrier means, hitch means provided on the carrier means for securing thereof to the lift apparatus, dual latch means provided on said carrier means for cooperating with said journal means for removably securing the implement means to the carrier means, transversely extending rod means provided on said carrier means and rotatable about its own longitudinal axis for simultaneous actuation of said dual latch means, said implement means being a multi-purpose implement pivotal with respect to the carrier means to provide a plurality of relative working positions therebetween, and including locking means cooperating between the multi-purpose implement and the carrier means for locking the multi-purpose implement in each of said positions to provide for said plurality of work operations for the vehicle from a single implement, and including lever means secured to said multi-purpose implement for manual pivoting of said multi-purpose implement with respect to the carrier means.

3. A multi-purpose attachment for vehicles as set forth in claim 2 wherein the implement means comprises a cultivator attachment.

4. A multi-purpose attachment for vehicles as set forth in claim 2 wherein the implement means comprises a fork lift attachment.

5. A multi-purpose attachment for vehicles as set forth in claim 2 wherein the implement means comprises a roller compactor apparatus.

6. A multi-purpose attachment for vehicles as set forth in claim 2 wherein the implement means comprises a spool apparatus for carrying materials which may be reeled and unreeled therefrom.

7. A multi-purpose attachment for vehicles as set forth in claim 2 wherein the implement means comprises a soil ripper attachment.

* * * * *